US008274772B2

(12) United States Patent
Skov et al.

(10) Patent No.: US 8,274,772 B2
(45) Date of Patent: Sep. 25, 2012

(54) CURRENT DETECTION AND LIMITING METHOD AND APPARATUS

(75) Inventors: James Bunde Villadsen Skov, Laguna Niguel, CA (US); Lorenzo Crespi, Costa Mesa, CA (US); Ketan B. Patel, Lake Forest, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 819 days.

(21) Appl. No.: 12/341,753

(22) Filed: Dec. 22, 2008

(65) Prior Publication Data
US 2010/0157498 A1  Jun. 24, 2010

(51) Int. Cl.
*H02H 9/02* (2006.01)
*H02H 3/08* (2006.01)
(52) U.S. Cl. ........... 361/93.9; 361/31; 361/87; 361/93.1
(58) Field of Classification Search .......... 361/93.9, 361/31, 87, 93.1
See application file for complete search history.

(56) References Cited

U.S. PATENT DOCUMENTS

| 4,570,198 | A * | 2/1986 | Storti et al. ............ 361/20 |
| 5,226,078 | A * | 7/1993 | Coulmance et al. ......... 379/413 |
| 6,631,064 | B2 * | 10/2003 | Schuellein et al. ......... 361/93.1 |
| 7,123,932 | B2 * | 10/2006 | Ha ............... 455/522 |
| 7,501,898 | B2 * | 3/2009 | Chow ............ 330/308 |
| 7,773,358 | B2 * | 8/2010 | Neesgaard et al. ......... 361/93.1 |
| 2007/0268642 | A1 * | 11/2007 | Metayer et al. ............. 361/93.1 |

* cited by examiner

*Primary Examiner* — Rexford N Barnie
*Assistant Examiner* — Zeev V Kitov
(74) *Attorney, Agent, or Firm* — Jackson Walker L.L.P.; Christopher J. Rourk

(57) ABSTRACT

An apparatus for detecting and controlling current. A current detector for generating a first value that represents an amount of current being delivered to a device. A current limit circuit for generating a second value that represents a maximum permitted current level from a current source. A current controller for controlling the amount of current drawn by the device if the first value exceeds the second value.

17 Claims, 4 Drawing Sheets

CURRENT DETECTION AND LIMITING METHOD AND APPARATUS

FIELD OF THE INVENTION

The invention relates to methods and apparatuses for current detection and limiting, and more specifically to a method and apparatus for current detection and limiting for devices driven from current limited sources, such as audio amplifiers driven from a USB bus.

BACKGROUND OF THE INVENTION

Audio systems that are powered by a USB bus supply require a tradeoff between the peak output power delivered to the speaker loads and proper compliance with USB standards. The USB standard requires the USB host to supply a minimum of 500 mA of continuous current, with brief support of higher peak levels of limited duration. It is also the USB host's responsibility to detect when a device connected to any individual port violates the current limit and to act appropriately to protect the host as well as other devices connected to other USB ports. The offending port can be reset to see if that corrects the excessive current draw. If the current limit is repeatedly violated, the port could be disabled and the user would be notified that something is wrong and that the port will have to be manually reactivated.

In contrast to these host limitations, marketing directives push for the "loudest" or highest power audio system feasible (where power is proportional to current). Since the USB restrictions are rigid requirements, it is necessary to maximize output power without violating the USB current limitation. However, prior art solutions that violate the current limit often result in a device reset, which causes the audio device to become disconnected from the USB host and requires the device to be re-initiated by the host. When the device resets, the audio stream ends abruptly and the user has to restart the playback. Alternatively, if the device doesn't reset, the USB host can reset the port itself, resulting in similar consequences. If multiple resets occur, the USB host could ultimately disable the port completely.

In order to avoid the issues described so far, two basic solutions have been seen: either limit the output level at all times to avoid ever drawing too much current, or add current limiting between the host and amplifier. The former disproportionately trades performance for compliance, while the latter adds considerable cost to the system. An alternative approach that is commonly seen it to add current detection in the amplifier's output to detect excessive load current draw. While this approach can handle gross situations like short-circuits, it is difficult to optimize load power because there usually isn't a simple relationship between the load current and supply current. Intermediate thresholds can be achieved, but the issue is that the load current isn't a precise measure of the supply current. Because the supply current is related to the load current via efficiency calculations, and the efficiency isn't well known in every condition, this method requires the designer to use the most conservative estimate of efficiency, thus resulting in a less than optimal design.

SUMMARY OF THE INVENTION

The current invention provides a method and apparatus for current detection and limiting that prevent device or port reset or other supply interruptions for systems or devices that receive power from a current limited source.

In accordance with an exemplary embodiment of the present invention, an apparatus for detecting and controlling current is provided. A current detector generates a first value that represents an amount of current being delivered to a device, such as a voltage drop across a resistor that is in line with the current being provided to the device. A current limit circuit generates a second value that represents a maximum permitted current level from a current source, such as based on a voltage drop generated across a predetermined resistance that is driven by a predetermined bias current. A current controller controls the amount of current drawn by the device if the first value exceeds the second value, such as by decreasing the gain of a pre-amplifier to the device, where the device is an audio amplifier.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
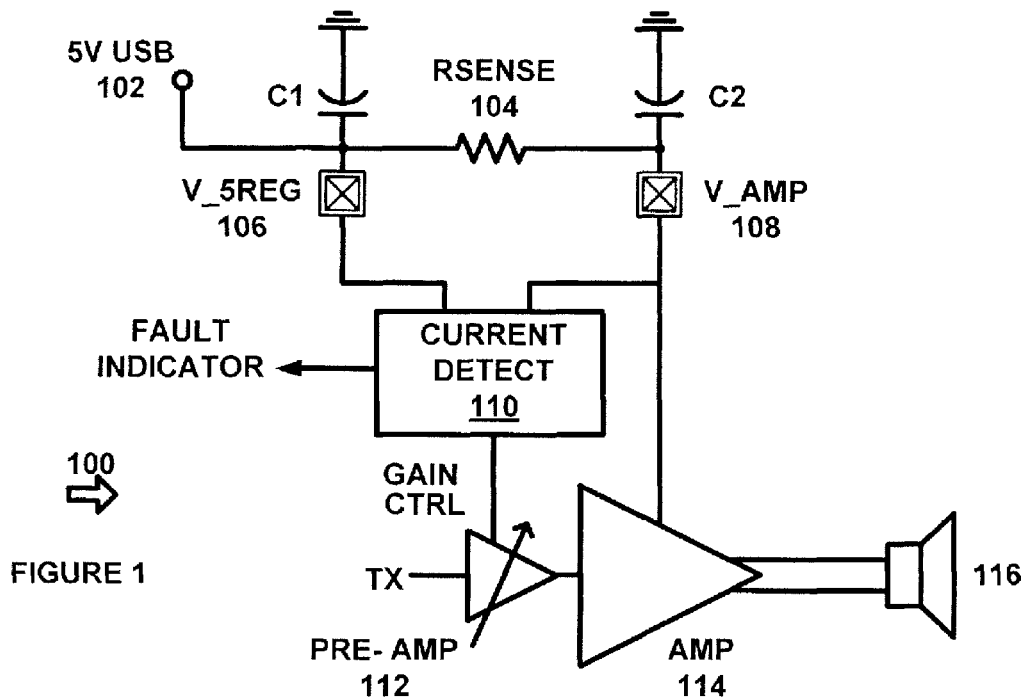
FIG. 1 is a diagram of a system for current detection and limiting in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for current detection and limiting in accordance with an exemplary embodiment of the present invention. System 100 can be used with an audio amplifier system powered from a current-limited power supply, such as a USB host, other suitable systems driven from a USB host, other suitable systems driven from a current-limited power source, or for other suitable purposes.

System 100 can be implemented in hardware, software, or a suitable combination of hardware and software, and can be one or more hardware components in an integrated circuit. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

A power signal is received at 5V USB 102 and provided to amplifier 114 through RSENSE 104, which is used to generate a current measurement value for use by current detect 110. Current detect 110 provides gain control to pre-amp 112, which receives the audio signal being processed and performs pre-amplification of the audio signal before it is provided to amplifier 114. In this manner, the current that is being drawn by amplifier 114 can be measured and used to control the gain of pre-amp 112, so as to limit the current to a predetermined level.

System 100 includes V_5REG 106, which is an input supply pin or other suitable input supply devices for system 100. V_5REG 106 can drive an on-chip regulator that generates the analog and digital voltage supplies and performs other suitable functions. V_AMP 108 is the supply pin or other suitable devices for the audio amplifier. Although a mono mode system having a single speaker 116 is shown, system 100 can be used for stereo amplifier configurations or other suitable devices. In one exemplary embodiment, for a stereo amplifier, V_AMP 108 may be separated into individual amplifier pins or other suitable devices, such as a V_AMP left pin and a V_AMP right pin.

In one exemplary embodiment, V_5REG 106 and V_AMP 108 can be separated from each other by a predetermined distance, as well as from other components of system 100, in order to minimize noise, crosstalk coupling and other undesired effects. Low-pass filtering can be provided by de-coupling capacitors C1 and C2, which are typically present and do not need to be added. Current measurement can be accomplished with RSENSE 104, which is coupled between the existing supply pins, thereby minimizing cost by eliminating the need for extra device pins or other connecting structures. Costs can be further reduced by including RSENSE 104 within the integrated circuit device package. RSENSE 104 can be implemented using bond wires at V_AMP 108 or in other suitable manners.

The voltage across RSENSE 104 can be measured by current detect 110 and compared against a predetermined voltage reference that represents a particular threshold current, such as a voltage reference that is based on the value of RSENSE 104 and the current limits of the power source, such as a USB bus. If the measured voltage exceeds the predetermined voltage reference, which indicates that the sensed current exceeds a threshold current, current detect 110 can generate a signal that represents that the sensed current has exceeded the threshold, such as a predetermined digital value or other suitable signals. The signal, such as a digital indicator, can also be used to control the current drawn by amplifier 114 by controlling the gain of pre-amp 112. In one exemplary embodiment, if an overcurrent status signal is generated, the gain of pre-amplifier 112 can be reduced in order to reduce the supply current. In another exemplary embodiment, if the supply current drops below a second predetermined threshold (such as a lower voltage value than the voltage value representing the overcurrent threshold) and the status signal resets low, the gain of pre-amp 112 can then be returned to its nominal value. If reducing the gain of pre-amp 112 does not lower the current and a second, higher current status signal is generated, which may indicate a short circuit or other malfunction, then that second status signal can be used to disable amplifier 114. Other suitable decision trees and actions can be implemented, so as to create a feedback loop that measures the supply current and that keeps it below a predetermined threshold.

In operation, a current detection and limiting system is provided that can be used with an audio amplifier system or other suitable systems that are powered from a current-limited power supply, such as a USB host, or other suitable power supplies. The current detection and limiting provided by system 100 measures current being supplied to amplifier 114 directly, and uses this information to control the audio amplifier gain in a manner that lowers the supply current's peak magnitude and duration. The current detection and limiting of system 100 is low in device costs and requires no additional device pins, and can be applied in a suitable location, such that it does not need to be integrated into the audio amplifier.

Figure 2:
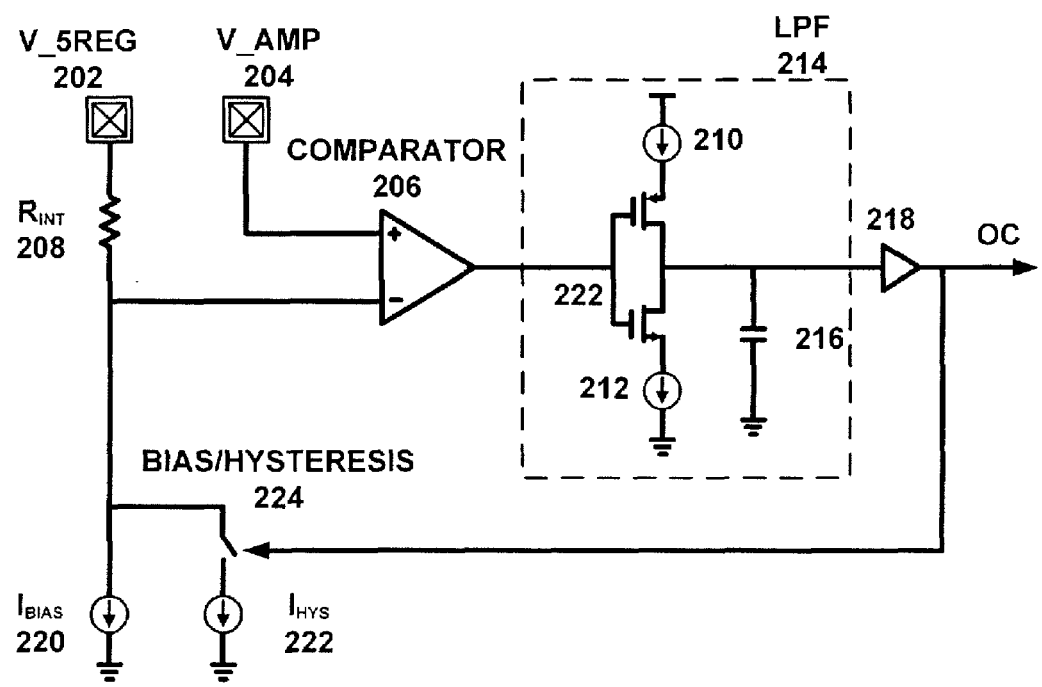
FIG. 2 is a diagram of a system for current detection in accordance with an exemplary embodiment of the present invention.

FIG. 2 is a diagram of a system 200 for current detection in accordance with an exemplary embodiment of the present invention. System 200 can be implemented in hardware, such as in an integrated circuit, or in other suitable manners.

Current source $I_{BIAS}$ 220 causes a voltage drop across internal resistor $R_{INT}$ 208, which introduces an offset at the input of comparator 206. The output of comparator 206 will remain high until the voltage difference between V_5REG 202 and V_AMP 204 is greater than the offset. Because the voltage between the two pins is proportional to the amplifier current, the following relationship can be used to define the operation of comparator 206:

$$V_{comp} = \text{high if } I_{AMP} \cdot R_{SENSE} < I_{BIAS} \cdot R_{INT}$$

$$V_{comp} = \text{low if } I_{AMP} \cdot R_{SENSE} > I_{BIAS} \cdot R_{INT}$$

Thus, the equivalent current threshold can be defined as:

$$I_{THRESH} = I_{BIAS} \frac{R_{INT}}{R_{SENSE}}$$

By making either bias current $I_{BIAS}$ 220 or internal resistor $R_{INT}$ 208 programmable, different thresholds can be set, such as by providing predetermined control data associated with each threshold. In this exemplary embodiment, variations in the value of $R_{SENSE}$ can be accommodated, variations in the current limit thresholds of the current supply can be provided, or other suitable conditions can be controlled, so as to allow system 200 to be used in a variety of different applications.

Comparator 206 is coupled to blanking filter LPF 214 that can be implemented as a weak digital inverter driving an on-chip capacitor 216 or in other suitable manners. Blanking filter LPF 214 can be used to filter out transients or noise that can cause false detections. In one exemplary embodiment, current sources 210 and 212 are coupled to transistor pair 222, which receives the output of comparator 206 at the gate of each transistor. Capacitor 216 is used to provide additional low-pass filtering. The filtered signal can be stored in buffer 218 and output as a digital level. Additional filtering or post-processing can also be performed on this signal if suitable.

For additional deglitching and improved noise immunity, hysteresis can be added to the thresholds by using the digital output to control a current source in parallel with the bias current. In this exemplary embodiment, when the supply current is below a predetermined threshold, the effective bias current is the sum of the two currents $I_{BIAS}$ 220 and $I_{HYS}$ 222. When the overcurrent protection of system 200 is activated, the hysteresis current source $I_{HYS}$ 222 can be disabled, such that the current threshold is reduced. The effective thresholds can be defined by:

$$I_{THRESH\_H} = (I_{BIAS} + I_{HYS})\frac{R_{INT}}{R_{SENSE}}$$

$$I_{THRESH\_L} = I_{BIAS}\frac{R_{INT}}{R_{SENSE}}$$

In one exemplary embodiment, the upper threshold can be 450 mA while the lower threshold can be 400 mA, such as when a USB bus is providing the current. Thus, system 200 can be configured to trip when the supply current exceeds 450 mA, but not to reset until the supply current goes below 400 mA. This hysteresis function can be used to help avoid oscillations, such as when the supply current is varying near a threshold or in other suitable conditions.

Figure 3:
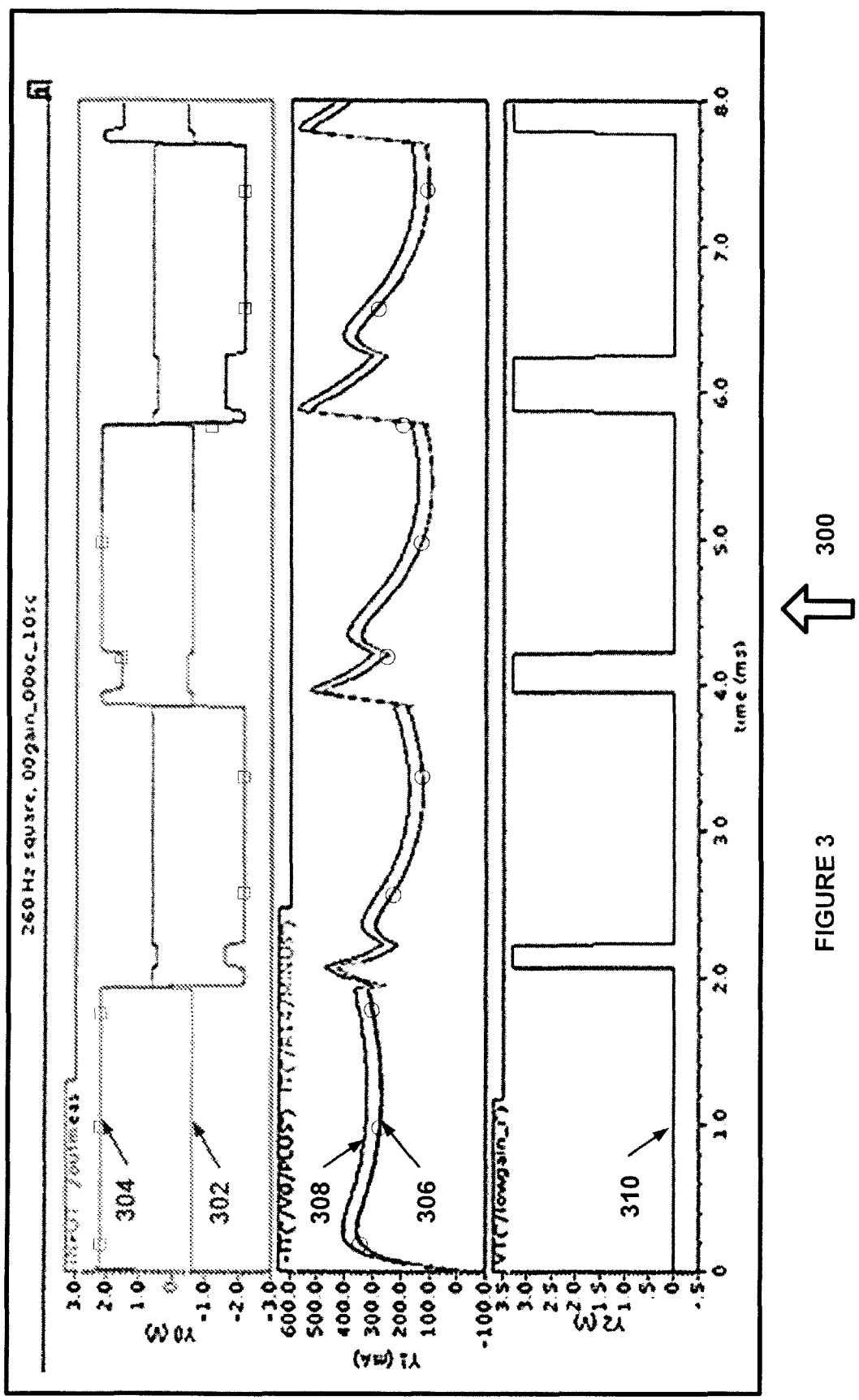
FIG. 3 is a diagram of a simulation of the operation of a current detection and limiting system in accordance with an exemplary embodiment of the present invention.

FIG. 3 is a diagram 300 of a simulation of the operation of a current detection and limiting system in accordance with an exemplary embodiment of the present invention. The simulated system utilizes one detector cell with hysteresis enabled. A 260 Hz square wave is applied to the amplifier. The top plot shows the output of the pre-amplifier (trace 302) and the output load voltage (trace 304). The middle plot shows the amplifier current flowing through the sense resistor (trace 306) and the USB supply current (trace 308). The USB current is greater than the amplifier current since it includes the current flowing into the V_5REG pin. The lower trace (trace 310) is the current detector's digital output; a high signal indicates that an over-current situation is present. From the simulation it can be seen that when the amplifier current is above the predetermined threshold, the detector output goes high and the pre-amplifier's gain is reduced by 3 dB (see "notches" in the load waveform that align with the lower detection trace). This reduction in gain causes the supply current to begin reducing. Once the current dropped below the second lower threshold, the gain returns to its nominal value.

If a sinusoidal waveform is used, the current never goes too high and the gain isn't changed. Thus, the system allows the transmission of most signals without any additional distortion while at the same time passing square waves without drawing too much current. This allows the system to meet USB requirements without sacrificing output power.

Figure 4:
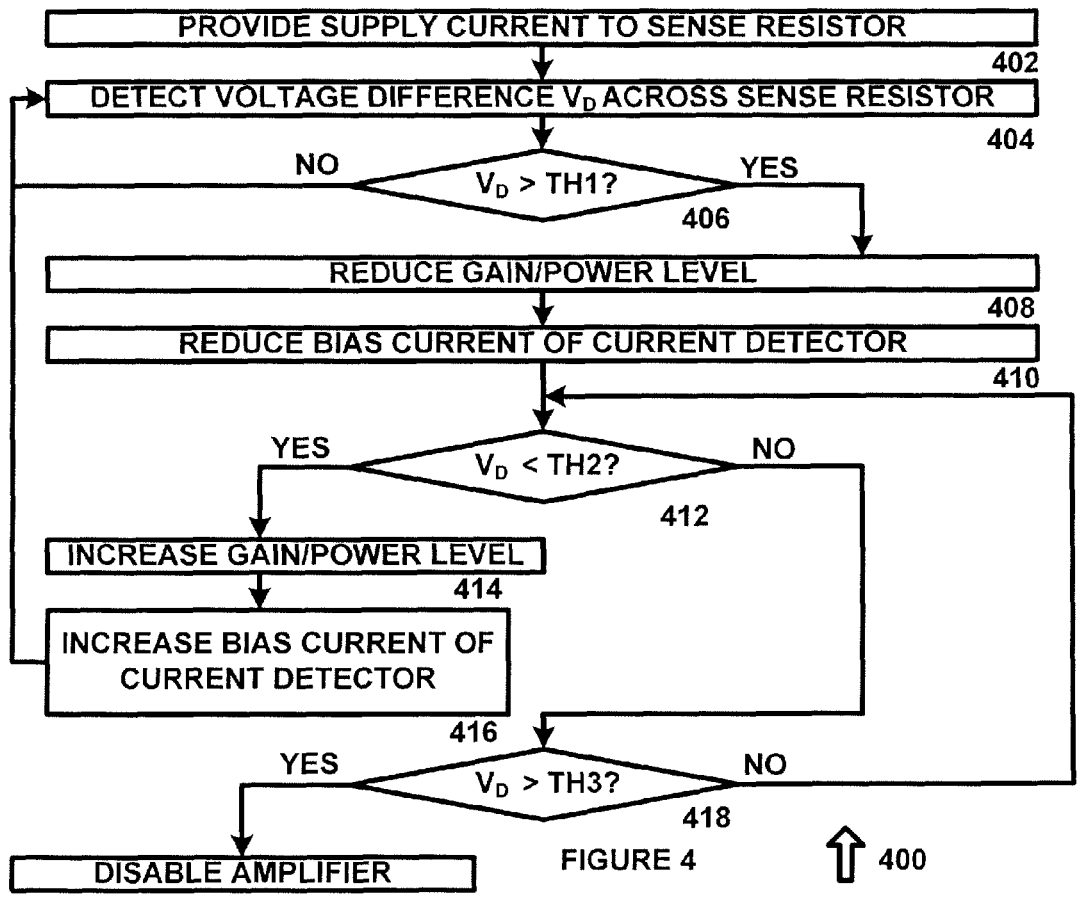
FIG. 4 is a flow chart of a method for current detection and limiting in accordance with an exemplary embodiment of the present invention.

FIG. 4 is a flow chart of a method 400 for current detection and limiting in accordance with an exemplary embodiment of the present invention. Method 400 begins at 402, where a supply current is provided through a sense resistor. In one exemplary embodiment, the supply current can be the current that is provided to a peripheral device from a current source having maximum current limitations, such as an audio device that is driven from a USB bus or other suitable devices and current sources. The method then proceeds to 404.

At 404, a voltage difference $V_D$ across the sense resistor is detected, such as by comparing the voltage to a voltage generated across a second resistor driven by a bias current or in other suitable manners. The method then proceeds to 406.

At 406, it is determined whether the voltage difference $V_D$ is greater than a first threshold value TH1. In one exemplary embodiment, the threshold value TH1 can be determined based on a voltage that corresponds to a maximum current threshold that should be conducted through the sense resistor, or in other suitable manners. If it is determined that $V_D$ is less than the threshold value TH1, the method returns to 404. Otherwise, the method proceeds to 408.

At 408, the gain or power level of a peripheral device that is receiving the drive current is reduced. In one exemplary embodiment, the gain of a pre-amplifier for an audio amplifier can be reduced, so as to reduce the current being drawn by the audio amplifier. Likewise, other suitable functions can be performed to reduce the current being drawn from the current source. The method then proceeds to 410.

At 410, the bias current for the current detector can be reduced so as to reduce the voltage provided to a comparator or other suitable devices. In one exemplary embodiment, the bias voltage can be used to generate a reference voltage, such as TH1, that the voltage from the sense resistor is compared to, such that a reduction in the bias current reduces the reference voltage by a predetermined amount to a new level, such as TH2. In this manner, when the current being drawn from the current source is rapidly varying around the threshold current level, rapid fluctuations in gain can be avoided. The method then proceeds to 412.

At 412, it is determined whether the voltage difference $V_D$ has decreased below a second threshold TH2. In one exemplary embodiment, when the voltage difference $V_D$ has decreased, that can indicate that the current being drawn from the current source has decreased below a level at which the current source will shut down, reset or otherwise interfere with the operation of the device being driven by the current source. If the voltage difference $V_D$ has decreased below TH2, the method proceeds to 414, where the gain, power level or other setting of the device or system that is receiving current from the current source is increased. Alternatively, the second threshold can be omitted and it can be determined at 412 whether the voltage difference $V_D$ has decreased below the first threshold TH1, such as in embodiments where a second bias current source such as $I_{HYS}$ 22 of FIG. 2 is not used. The method then proceeds to 416.

At 416, the bias current of the current detector is increased, such as to increase the voltage that the detector uses to compare to a sensed voltage that corresponds to the current being received from the current source. In one exemplary embodiment, the bias current can be decreased, as previously described, to avoid rapid fluctuations in gain, power level or other settings, and can be returned to a higher level once the current being drawn from the current source has decreased by a predetermined amount below the upper threshold. Alternatively, where a second bias current source such as $I_{HYS}$ 22 of FIG. 2 is not used, 416 can be omitted. The method then returns to 404.

If it is determined at 412 that the voltage difference $V_D$ has not decreased below a second threshold TH2, the method proceeds to 418, where it is determined whether the voltage difference $V_D$ has increased above a third threshold TH3. In one exemplary embodiment, a second detector or other suitable configurations can be used to detect whether a higher sensed voltage has been measured, such as a sensed voltage that corresponds to a current level from the current source that is not sustainable. In this exemplary embodiment, the device or system receiving the current from the current source may have malfunctioned, a short circuit may be present, or other conditions may exist that require an indication to be generated, the system or device to be disabled, or other actions to be taken. If it is determined at 418 that the voltage difference $V_D$ has not increased above the third threshold TH3, the method returns to 412. Otherwise, the method proceeds to 420 where the amplifier or other device or system is disabled, a notification signal is generated, or other suitable processes are also or alternatively performed. Alternatively, 418 can be performed in parallel with 406, instead of sequentially as shown.

In operation, method 400 allows a device or system that is being driven from a current limited power source, such as an audio amplifier that is driven from a USB bus or other suitable devices or systems that are being driven from other suitable power sources, to be monitored so as to reduce the current provided to the device or system to prevent the current source from being overdriven, which can result in interruption of the current source and disruption of operation of the system or device. Method 400 can also prevent rapid fluctuations in the control state, and can also detect when a condition exists requiring the system or device to be disabled.

Figure 5:
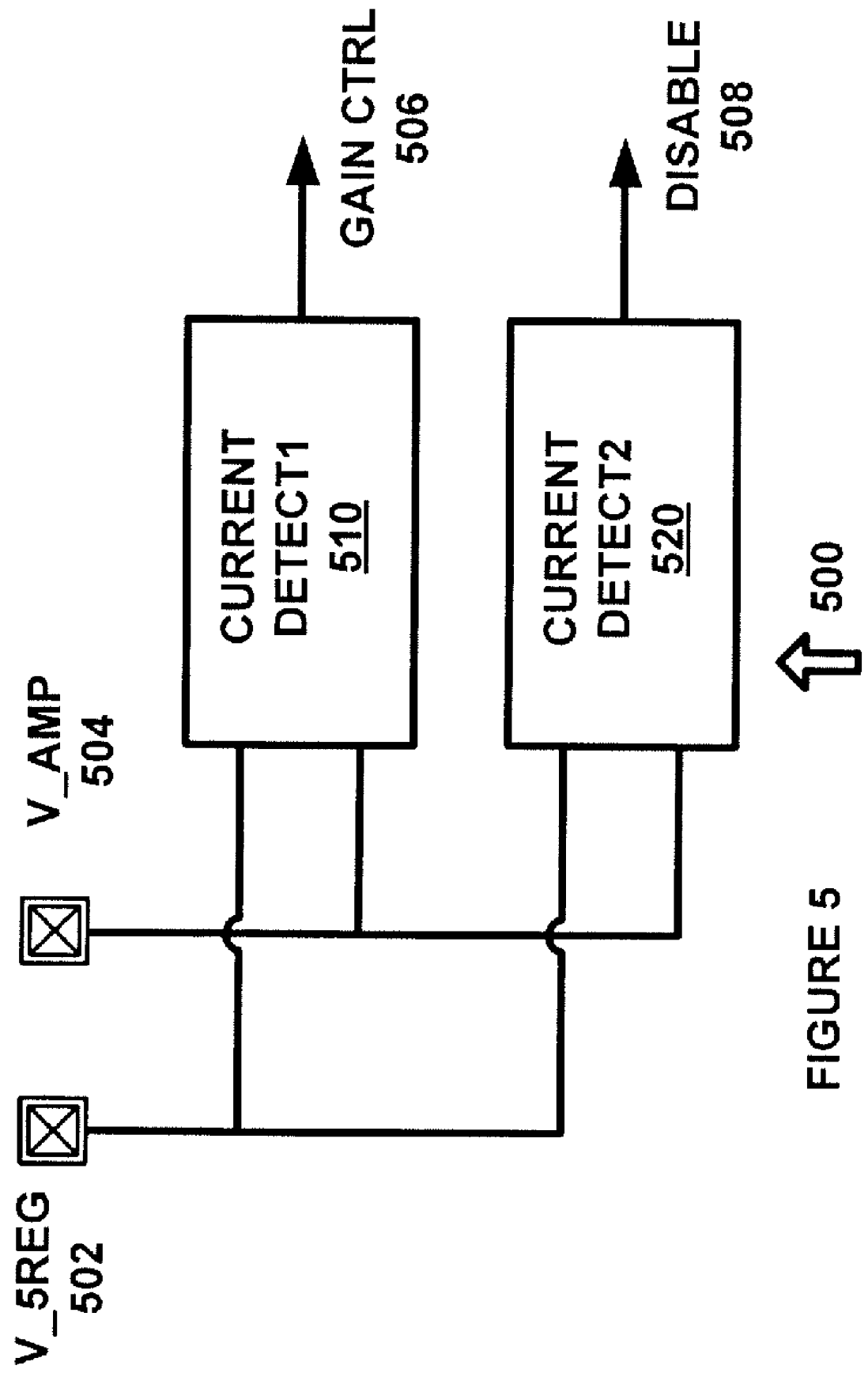
FIG. 5 is a diagram of a system for current detection at multiple levels in accordance with an exemplary embodiment of the present invention.

FIG. 5 is a diagram of a system 500 for current detection at multiple levels in accordance with an exemplary embodiment of the present invention. System 500 can be implemented in hardware, such as in an integrated circuit, or in other suitable manners.

In order to detect multiple thresholds at the same time, additional instantiations of system 200 can be added in parallel. In one exemplary embodiment, a first detector cell could be set with a threshold at 450 mA and a second detector cell could be set with a threshold of 700 mA. The first detector cell's output can thus be used to lower the amplifier gain, while the second higher-threshold detector cell could be used to power off the amplifier and provide user notification data, such as through a fault indicator output as shown in FIG. 1, as an indicator of a potential fault or short circuit.

The description and behavior of ports V_5REG 502 and V_AMP 504 and the first detector CURRENT DETECT1 510 is as given for system 200 in FIG. 2. A second current detection system 200 is added in parallel as CURRENT DETECT2 520. In one exemplary embodiment, CURRENT DETECT1 510 is configured to have hysteresis enabled and has a high threshold of 450 mA and a low threshold of 400 mA. CURRENT DETECT1 510 has an output GAIN CTRL 506 that can be used to lower the amplifier gain. CURRENT DETECT2 520 can be configured to have hysteresis disabled and has a threshold of 700 mA. CURRENT DETECT2 520 has an output DISABLE 508 that can be used to disable the amplifier and provide user notification data, such as an indicator of a potential fault or short circuit. Additional filtering can be added to the outputs of either or both of the detector cells to prevent inadvertent detections or disablement due to transients.

Although exemplary embodiments of an apparatus of the present invention have been described in detail herein, those skilled in the art will also recognize that various substitutions and modifications can be made to the apparatus without departing from the scope and spirit of the appended claims.

What is claimed is:

1. An apparatus for detecting and controlling current comprising:
   a current detector for generating a first value that represents an amount of current being delivered to a device;
   a current limit circuit for generating a second value that represents a maximum current level which may be drawn from a power supply source;
   a current controller for controlling the amount of current drawn by the device if the first value exceeds the second value; and
   a second current controller for disconnecting the device if the first value exceeds a third value that represents a short circuit condition;
   wherein the current limit circuit comprises:
   a resistor having a predetermined value;
   a first bias current source coupled to the resistor, the first bias current source providing a first predetermined current;
   a second bias current source coupled to the resistor, the second bias current source providing a second predetermined current; and
   a switch for disconnecting the second bias current source if the first value exceeds the second value.

2. The apparatus of claim 1 wherein the first value is generated by a voltage drop across a resistor that is in line with the current being delivered to the device.

3. The apparatus of claim 1 wherein the current limit circuit comprises:
   a resistor having a predetermined value; and
   a bias current source coupled to the resistor, the bias current source providing a predetermined current.

4. The apparatus of claim 1 wherein the current controller for controlling the amount of current drawn by the device if the first value exceeds the second value comprises a gain control for controlling a gain of a pre-amplifier.

5. The apparatus of claim 1 further comprising circuitry for reconnecting the second bias current source if the first value is lower than a third value.

6. The apparatus of claim 1 further comprising a second current controller for disconnecting the device if the first value exceeds a third value.

7. The apparatus of claim 1 wherein the current detector for generating the first value that represents the amount of current being delivered to the device comprises means for generating the first value that represents the amount of current being delivered to the device.

8. The apparatus of claim 1 wherein the current limit circuit for generating the second value that represents the maximum permitted current level from the current source comprises means for generating the second value that represents the maximum permitted current level from the current source.

9. The apparatus of claim 1 wherein the current controller for controlling the amount of current drawn by the device if the first value exceeds the second value comprises means for controlling the amount of current drawn by the device if the first value exceeds the second value.

10. An apparatus for detecting and controlling current comprising:
    a current detector for generating a first value that represents an amount of current being delivered to a device;
    a current limit circuit for generating a second value that represents a maximum current level which may be drawn from a power supply source, the current limit circuit comprising:
    a resistor having a predetermined value;
    a first bias current source coupled to the resistor, the first bias current source providing a first predetermined current;
    a second bias current source coupled to the resistor, the second bias current source providing a second predetermined current;
    a switch for disconnecting the second bias current source if the first value exceeds the second value; and
    circuitry for reconnecting the second bias current source if the first value is lower than a third value;
    a current controller for controlling the amount of current drawn by the device if the first value exceeds the second value, comprising a gain control for controlling a gain of a pre-amplifier;
    a second current controller for disconnecting the device if the first value exceeds a fourth value; and
    wherein the first value is generated by a voltage drop across a resistor that is in line with the current being delivered to the device.

11. A method for detecting and controlling current comprising:
    generating a first voltage from a sense resistor in line with a current being provided to a device;

generating a second voltage from a reference resistor in line with a bias current source;

generating a control signal to reduce the current being provided to the device if the first voltage is greater than the second voltage;

reducing a bias current of the bias current source after generating the control signal; and increasing the bias current if the first voltage is less than a third voltage.

12. The method of claim 11 further comprising reducing a bias current of the bias current source after generating the control signal.

13. The method of claim 12 further comprising:

generating a third voltage from the reference resistor and the reduced bias current; and terminating the generation of the control signal to reduce the current being provided to the device if the first voltage is less than the third voltage.

14. The method of claim 12 further comprising:

generating a third voltage from a second reference resistor in line with a second bias current source; and generating a control signal to disable the device if the first voltage is greater than the third voltage.

15. The method of claim 11 further comprising:

generating the third voltage from the reference resistor and the reduced bias current; and terminating the generation of the control signal to reduce the current being provided to the device if the first voltage is less than the third voltage.

16. The apparatus of claim 1 wherein the maximum current level set by the current source is less than the maximum available current level from the power supply source.

17. The apparatus of claim 1 wherein the device is a USB-connected audio device and the current limit circuit is a USB protective device.

* * * * *

UNITED STATES PATENT AND TRADEMARK OFFICE
CERTIFICATE OF CORRECTION

PATENT NO. : 8,274,772 B2  
APPLICATION NO. : 12/341753  
DATED : September 25, 2012  
INVENTOR(S) : James Bunde Villadsen Skov, Lorenzo Crespi and Ketan B. Patel It is certified that error appears in the above-identified patent and that said Letters Patent is hereby corrected as shown below:

Column 8, line 46, replace "currentsource" with "current source"

Signed and Sealed this  
Thirteenth Day of November, 2012

David J. Kappos  
*Director of the United States Patent and Trademark Office*